United States Patent

[11] 3,571,548

| [72] | Inventor | Thomas F. Osika<br>Gary, Ind. |
|---|---|---|
| [21] | Appl. No. | 812,114 |
| [22] | Filed | Apr. 1, 1969 |
| [45] | Patented | Mar. 23, 1971 |
| [73] | Assignee | McGill Manufacturing Company, Inc.<br>Valparaiso, Ind. |

[54] SNAP-IN MOUNTING FOR AN ELECTRICAL SWITCH
3 Claims, 5 Drawing Figs.

[52] U.S. Cl. .................................................. 200/168
[51] Int. Cl. ............................................... H01h 9/02
[50] Field of Search .......................................... 200/168
(A), 168 (B), 168 (C), 167 (A)

[56] References Cited
UNITED STATES PATENTS

| 3,213,189 | 10/1965 | Mitchell et al. | 200/168(C)(X) |
| 3,305,658 | 2/1967 | Heyhal | 200/168(C) |
| 3,308,260 | 3/1967 | Krieger et al. | 200/168(C) |
| 3,339,050 | 8/1967 | Mitchell | 200/168(C) |
| 3,412,225 | 11/1968 | Rogers et al. | 200/168(C) |
| 3,491,220 | 1/1970 | Mitchell et al. | 200/167(A) |

*Primary Examiner* — H. O. Jones
*Attorney* — Mueller and Aichele

ABSTRACT: Apparatus for attaching an electrical switch case to a mounting plate includes a cover member for the switch casing, having an upper bezeled portion which is supported by the mounting plate. Switch case locking tabs are molded integral with the bezel and extend downward through an aperture in the mounting plate. The switch case is connected to the cover member by snapping the locking tabs thereabout. Integral with each of the end locking tabs extend resilient arms for mounting the cover member with the switch casing positioned therein to the mounting plate. The end of each of the arms has a groove therein which engages the corresponding edge of the aperture in the mounting plate thereby resiliently securing the cover to the plate. Compression of the arms also biases the end locking tabs tightly against the switch casing to lock the same in place.

PATENTED MAR 23 1971  3,571,548
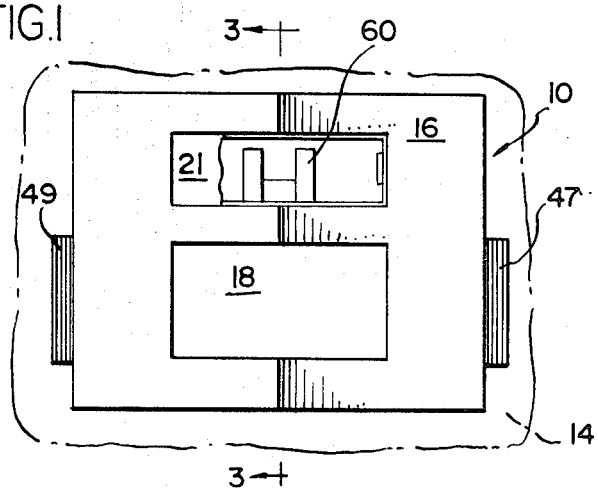
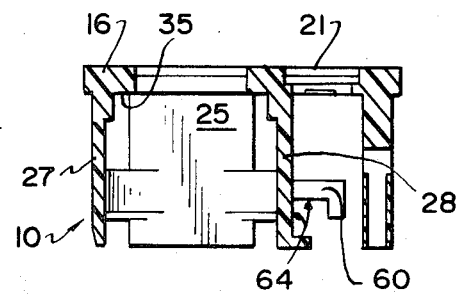
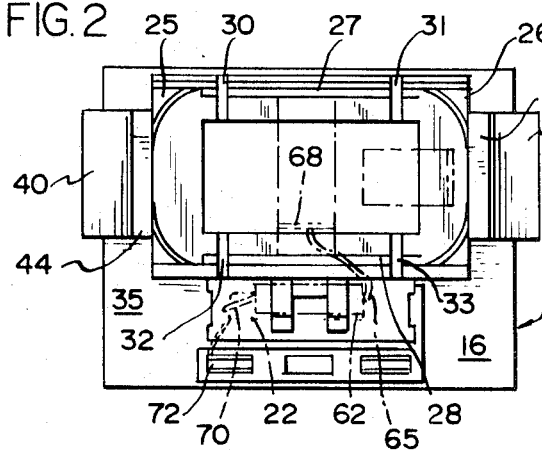
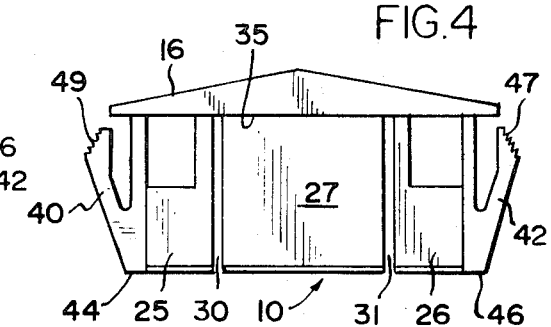
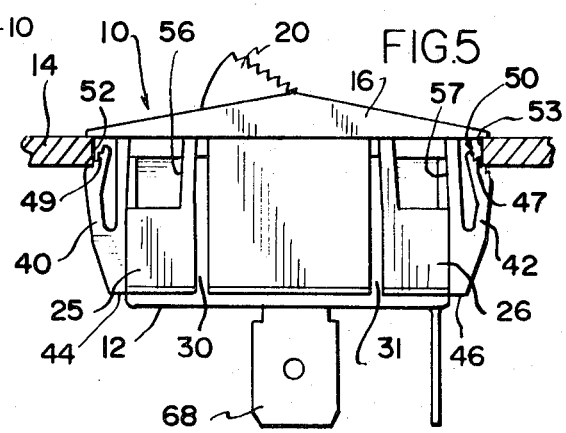
INVENTOR
THOMAS F. OSIKA
BY Mueller, Aichele & Rauner
ATTORNEYS.

SNAP-IN MOUNTING FOR AN ELECTRICAL SWITCH

BACKGROUND OF THE INVENTION

There are many applications for electrical switches where it is desirable to be able to rapidly mount the switch casing through an opening in a mounting plate. Frequently the approach has been to provide a cover member for the switch casing which snaps into place about the switch. Subsequently an additional mounting bezel is attached by various means to the cover member and used to mount the switch to the mounting plate. The use of this separate bezel piece not only complicates the assembly of the switch to the mounting plate but also adds to the cost of the entire switch assembly.

SUMMARY OF THE INVENTION

It is an object of this invention to provide a unique structure for rapidly assembling an electrical switch to a mounting plate.

In practicing one specific embodiment of this invention, a cover member for a switch casing includes an upper bezel portion, which has resilient integral end and sideleg portions extending downward therefrom. Each of the leg portions are separated from one another by channels which extend from the bezel portion the full length of the leg portions. The extended leg portions define a housing, and the switch casing is fitted into the housing by snapping the resilient leg portions thereabout to secure the casing to the cover member. Integral with each of the end leg portions are arm portions which extend at an acute angle from the end away from the bezel portion and in a direction upward toward the same. Each arm portion has a serrated portion at the end thereof that extends at an angle transverse to the same and inwardly toward the leg portion. The cover member is mounted to a mounting plate by inserting the same through a hole in the plate. The serrations are engaged by opposite edges of the plate which define the hole and which compress the arms thereby resiliently locking the cover member to the mounting plate. Compression of the arm portions bias the end leg portions against the switch casing to lock the same within the cover member.

DESCRIPTION OF THE DRAWING

FIG. 1 is a top plan view of a switch assembly in accordance with this invention;

FIG. 2 is a bottom plan view of the switch assembly of FIG. 1;

FIG. 3 is a cross section taken along the lines 3—3 of FIG. 1;

FIG. 4 is a side elevation view of the switch casing of FIG. 1; and

FIG. 5 is a side elevation view of the switch assembly of FIG. 1 positioned on a mounting plate.

DETAILED DESCRIPTION

Referring to the drawing, FIGS. 1—4 illustrate a cover member 10 that is used for mounting an electrical switch to a mounting member or plate 14 (FIG. 5). The cover member 10 includes an upper or top bezel portion 16, which has an aperture 18 therein for receiving the rocker 20 of the switch. A lens or window 21 is positioned adjacent the aperture 18 and exposes a lightbulb 22 which is energized to illuminate the switch. Extending downwardly from the upper bezeled portion 16 and integrally molded therewith are resilient end and side locking tabs or leg portions 25 and 26 and 27 and 28 respectively. Each of the leg portions are separated from one another by channels 30, 31, 32 and 33. These channels extend from the base 35 of the upper bezel portion for the full length of the leg portions. The extended legs define a housing, and the switch casing 12 is secured in the housing by snapping the resilient leg portions thereabout. The particular switch illustrated in the drawings has an L-shaped shelf portion 60 extending from the side leg portion 28 on which the light 22 is supportingly positioned. A resistor 62 is contained in the space 64 beneath the shelf and supported therein. A lead 65 extends from the positive terminal 68 of the switch 12 to one end of the resistor 62 and a second lead 70 extends from the other end of the resistor 62 to the bulb 22, and to socket portion 72 where it is connected to a reference potential with the switch positioned on the mounting plate in an operating installation.

As best shown in FIG. 4, integral with each of the end leg portions 25 and 26 are arm portions 40 and 42 respectively, each of which extend at an acute angle from the distal ends 44 and 46 of the leg portions 25 and 26. The arms 40 and 42 extend upward toward the bezel portion 16, and each arm has a serrated portion 47 and 49 at the end thereof that extends at an angle generally transverse to the respective arms, and inwardly toward the leg portions.

FIG. 5 illustrates the unique way the cover member 10 is used to mount the switch 12 to the mounting plate 14. Initially, the switch 12 is secured in the housing by snapping the resilient leg portions thereabout. Subsequently, the cover member 10 is inserted into the aperture 50 in the mounting plate 14, which is defined by the edges 52 and 53 of the plate. The serrated portions 47 and 49 of the arms 42 and 40 are engaged by the edges 53 and 52 of the mounting plate and are compressed thereby to resiliently lock the cover member 10 in position on the mounting plate with the upper bezel portion 16 supported thereon. Compressing the arms 40 and 42 biases the end leg portions 25 and 26 against the switch casing 12 to further lock the same within the cover member 10. Each of the end legs 25 and 26 have sections 56 and 57 removed on both sides of the cover member to make the legs more resilient to permit the switch casing to be easily inserted at the onset of the assembly. The removed sections 56 and 57 provide a means for attaching to the shoulders of the switch case.

What has been described, therefore, is a unique one-piece cover member which integrally combines locking tabs for mounting a switch casing in a cover member and also resilient mounting means integral with the locking tabs which lock the cover member to a mounting plate.

I claim:

1. An electrical switch assembly including in combination, a switch casing having a switch positioned therewithin, a mounting member having an aperture therein defined by opposite edges of the mounting member extending the full depth thereof, a mounting device for the switch case comprising a bezel having resilient integral end and side legs extending therefrom, said end legs each having a first end portion integral with and extending transverse of said bezel and second side portions spaced from one another and each connected with substantially right angles to said first end portion, said second side portions also being integral with said bezel, said side legs separated from said second side portions of said end legs by channels extending from said second side portions of said end legs by channels extending from said bezel the full length of said end and side legs, said end and side legs defining a housing, resilient mounting means integral with each of said end legs, said bezel dimensioned greater than the aperture of said mounting member, said switch casing inserted in said housing and said end and side legs snapping thereabout to hold the same therewithin, said housing with said switch casing therewithin inserted through the aperture in said mounting member, said bezel supported by said mounting member, and said resilient mounting means engaging said edges defining the aperture resiliently securing said mounting device to said mounting member and further biasing said first end portions and said second side portions of said end legs inwardly thereby locking the switch casing to said mounting member.

2. The electrical switch assembly of claim 1 wherein said bezel further includes window means, light circuit mounting means, a light positioned in said mounting means and being visible through said window means, and resistor means connected to said bezel by said circuit mounting means and electrically connecting said light to said electrical switch which operates the same.

3. The electrical switch assembly of claim 1 wherein said resilient mounting means includes an arm portion integral with each of said first end portions of said end legs and extending from the distal end thereof at an acute angle in cantilever fashion away from said bezel and in a direction upward toward the same, each said arm portion having a serrated surface portion at the end thereof extending at an angle transverse thereto and inwardly toward said end legs, said edges of said mounting member defining the aperture opposite each of said resilient mounting means engaging a serration and compressing each said arm portion so that said switch casing mounting device is locked to said mounting member, and said arm portions being compressed biasing said end legs including said first end portion and said second side portions into said switch casing to lock the same within said mounting device.

UNITED STATES PATENT OFFICE
CERTIFICATE OF CORRECTION

Patent No. 3,571,548       Dated March 23, 1971

Inventor(s) Thomas Osika

It is certified that error appears in the above-identified patent and that said Letters Patent are hereby corrected as shown below:

Column 2, lines 52 and 53, cancel "by channels extending from said second side portions of said end legs".

Signed and sealed this 30th day of May 1972.

(SEAL)
Attest:

EDWARD M. FLETCHER, JR.
Attesting Officer

ROBERT GOTTSCHALK
Commissioner of Patents